US009076219B2

(12) United States Patent
Cha et al.

(10) Patent No.: US 9,076,219 B2
(45) Date of Patent: Jul. 7, 2015

(54) SPACE SEGMENTATION METHOD FOR 3D POINT CLOUDS

(75) Inventors: Youngmi Cha, Busan (KR); Chang Woo Chu, Daejeon (KR); Il Kyu Park, Daejeon (KR); Ji Hyung Lee, Daejeon (KR); Bonki Koo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 167 days.

(21) Appl. No.: 13/601,851

(22) Filed: Aug. 31, 2012

(65) Prior Publication Data

US 2013/0089259 A1     Apr. 11, 2013

(30) Foreign Application Priority Data

Oct. 7, 2011     (KR) ......................... 10-2011-0102601

(51) Int. Cl.
*G06K 9/34* (2006.01)
*G06T 7/00* (2006.01)
*G06K 9/00* (2006.01)

(52) U.S. Cl.
CPC .......... *G06T 7/0081* (2013.01); *G06K 9/00664* (2013.01); *G06T 2200/04* (2013.01); *G06T 2207/10028* (2013.01); *G06T 2207/20021* (2013.01); *G06T 2207/20144* (2013.01); *G06T 2207/20148* (2013.01)

(58) Field of Classification Search
None
See application file for complete search history.

(56) References Cited

U.S. PATENT DOCUMENTS

| 8,042,056 | B2 * | 10/2011 | Wheeler et al. | 715/764 |
| 8,396,293 | B1 * | 3/2013 | Korah et al. | 382/171 |
| 8,620,089 | B1 * | 12/2013 | Korah et al. | 382/195 |
| 2004/0153671 | A1 * | 8/2004 | Schuyler et al. | 713/201 |
| 2009/0310867 | A1 | 12/2009 | Matei et al. | |
| 2011/0115783 | A1 * | 5/2011 | Janson | 345/419 |
| 2012/0128207 | A1 * | 5/2012 | Manabe et al. | 382/103 |
| 2013/0218472 | A1 * | 8/2013 | Fu et al. | 702/5 |

FOREIGN PATENT DOCUMENTS

KR     10-1117045 A     3/2012

OTHER PUBLICATIONS

Anguelov, Dragomir, et al. "Discriminative learning of markov random fields for segmentation of 3d scan data." Computer Vision and Pattern Recognition, 2005. CVPR 2005. IEEE Computer Society Conference on. vol. 2. IEEE, 2005.*

(Continued)

*Primary Examiner* — Li Liu

(57) ABSTRACT

A space segmentation method for 3D point clouds is disclosed. A space segmentation method for 3D point clouds includes equally segmenting a space of the 3D point clouds into a plurality of grid cells; establishing a base plane corresponding to a ground part of the space of the 3D point clouds; accumulating points of all grid cells located perpendicular to the base plane in a grid cell of the base plane; and segmenting the grid cell in which the points are accumulated into an object part and a ground part according to the number of accumulated points.

7 Claims, 6 Drawing Sheets

(56) References Cited

OTHER PUBLICATIONS

Moosmann, Frank, Oliver Pink, and Christoph Stiller. "Segmentation of 3D lidar data in non-flat urban environments using a local convexity criterion." Intelligent Vehicles Symposium, 2009 IEEE. IEEE, 2009.*

M. Himmelsbach et al., "Real-time Object Classification in 3D Point Clouds Using Point Feature Histograms", The 2009 IEEE/RSJ International Conference on Intelligent Robots and Systems, Oct. 11-15, 2009, pp. 994-1000, IEEE.

* cited by examiner

SPACE SEGMENTATION METHOD FOR 3D POINT CLOUDS

CROSS-REFERENCE TO RELATED APPLICATIONS

The present application claims priority to Korean patent application number 10-2011-0102601, filed on Oct. 7, 2011, which is incorporated by reference in its entirety.

BACKGROUND OF THE INVENTION

The present invention relates to a space segmentation method for 3D point clouds, and more particularly to a space segmentation method for 3D point clouds so as to segment 3D point clouds from large-scale scanning into a plurality of spatially-meaningful groups.

Scanner devices have been widely used in various fields so as to quickly obtain correct 3D data.

Data obtained through the scanner device is called 3D point clouds. A variety of techniques for handling point clouds have been intensively.

The problem of segmenting 3D point clouds is considered to be the most principal and difficult problem, because real-world data obtained by the scanner device includes a large amount of noise. Because of noise, it is difficult to accurately discriminate a boundary between background data and an object.

The related art of the present invention has been disclosed in Korean Patent Laid-open Publication No. 10-2010-0106126 (published on Oct. 1, 2010).

SUMMARY OF THE INVENTION

Various embodiments of the present invention are directed to a space segmentation method for 3D point clouds that substantially obviates one or more problems due to limitations or disadvantages of the related art.

Embodiments of the present invention are directed to a space segmentation method for 3D point clouds, wherein the 3D point clouds are segmented into a ground part and other objects in real time using characteristics of each real-world object located perpendicular to the ground.

In accordance with an embodiment, a space segmentation method for 3D point clouds includes equally segmenting a space of the 3D point clouds into a plurality of grid cells; establishing a base plane corresponding to a ground part of the space of the 3D point clouds; accumulating points of all grid cells located perpendicular to the base plane in a grid cell of the base plane; and segmenting the grid cell in which the points are accumulated into an object part and a ground part according to the number of accumulated points.

In the equally-segmenting the space of the 3D point clouds into the plurality of grid cells, the grid cell may be segmented into equal-sized parts according to the number of points.

The accumulating the points in all the grid cells located perpendicular to the base plane may include: if the number of accumulated points is filtered and a value of definition of each grid cell of the base plane is equal to or higher than a threshold value, determining the corresponding grid cell to be an object-estimation grid cell used for object estimation. The accumulated points in base cells are filtered by Gaussian filter or high-pass filter and the base cells are set by simply thresholding the suitable values, setting all cells below the threshold to zero.

The segmenting the grid cell into the object part and the ground part according to the number of accumulated points may include: arranging the object-estimation grid cells in descending numerical order of the accumulated points, searching for a neighboring grid cell adjacent to the object-estimation grid cells according to the arranged order, and establishing a group using the searched result; extending the group to a three-dimensional (3D) range, and establishing an object-estimation bounding box estimated to be the object part; from among the object-estimation grid cells and the neighboring grid cell contained in the object-estimation bounding box, determining the smallest bounding box including the points to be an object-group bounding box indicating the object part; and determining a ground cell indicating the ground part using base-plane base grid cells not contained in the object-group bounding box.

The neighboring grid cell may be a grid cell located adjacent to the object-estimation grid cell in up, down, left, right, and diagonal directions.

The establishing the group by searching for the neighboring grid cell adjacent to the object-estimation grid cells may include: incorporating the object-estimation grid cells and the neighboring grid cell in the same group.

The establishing the group by searching for the neighboring grid cell adjacent to the object-estimation grid cells may include: if the object-estimation grid cells are previously contained in the group, incorporating the corresponding object-estimation grid cells into the same group.

The determining the ground cell indicating the ground part may include: from among the base grid cells not contained in the object-group bounding box, determining the lowest-height grid cell including the points to be the ground cell.

DESCRIPTION OF SPECIFIC EMBODIMENTS

Figure 1:
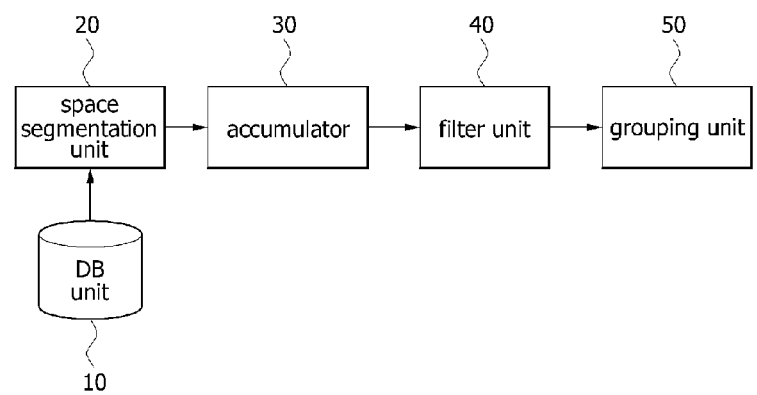
FIG. 1 is a block diagram illustrating a space segmentation apparatus of 3D point clouds according to an embodiment of the present invention.

Reference will now be made in detail to the embodiments of the present invention, examples of which are illustrated in the accompanying drawings. Wherever possible, the same reference numbers will be used throughout the drawings to refer to the same or like parts. A space segmentation method for 3D point clouds according to the present invention will hereinafter be described in detail with reference to the accompanying drawings. In the drawings, line thicknesses or sizes of elements may be exaggerated for clarity and convenience. Also, the following terms are defined considering functions of the present invention, and may be differently defined according to intention of an operator or custom. Therefore, the terms should be defined based on overall contents of the specification.

FIG. 1 is a block diagram illustrating a space segmentation apparatus of 3D point clouds according to an embodiment of the present invention.

Referring to FIG. 1, the space segmentation apparatus for the 3D point clouds includes a database (DB) unit 10, a space segmentation unit 20, an accumulator 30, a filter unit 40, and a grouping unit 50.

The DB unit 10 stores 3D point clouds obtained through various scanner devices (not shown) capable of obtaining 3D data.

The space segmentation unit 20 receives 3D point clouds from the DB unit 10, and segments the 3D point clouds into a plurality of equal-sized parts in the space 60, such that it obtains a plurality of grid cells 51.

In this case, each grid cell 51 is shaped as a predetermined-sized cube, and includes a plurality of 3D point clouds. A maximum number of points capable of being contained in one grid cell 51 may be determined by a user as necessary.

The accumulator 30 establishes a base plane 52 in the space 60 that is segmented into equal-sized grid cells 51 by the space segmentation unit 20. The accumulator 30 accumulates a total number of points contained in all the grid cells 51 located perpendicular to the base plane 52 in each grid cell located at a bottom indicating the ground. The above-mentioned operation of the accumulator 30 considers characteristics of all objects located perpendicular to the base plane.

In addition, x-y-z axes of the base plane 52 may be changed by the scanner device (not shown), such that they can be defined in various ways by a user.

For reference, each grid cell 51 located at the bottom will hereinafter be referred to as a base grid cell 53 for convenience of description.

The filter unit 40 filters the number of points vertically accumulated on the base plane 52, such that it further emphasizes a larger number of accumulated points and further reduces a smaller number of accumulated points. As a result, the filter unit 40 can reduce the influence of error values and also make highly effective (dramatic) boundary values.

A high-frequency emphasizing filter may be used as the filter unit 40. Specifically, the filter unit 40 increases definition as described above, and considers the grid cell 51 exceeding a threshold value to be an object-estimation grid cell 55.

The grouping unit 50 arranges values filtered by the filter unit 40 in descending numerical order, groups the arranged values into a first group corresponding to an object and a second group corresponding to the ground, and stores the two groups corresponding to the object and the ground.

The space segmentation method for 3D point clouds according to one embodiment of the present invention will hereinafter be described with reference to FIGS. 2 to 9.

Figure 2:
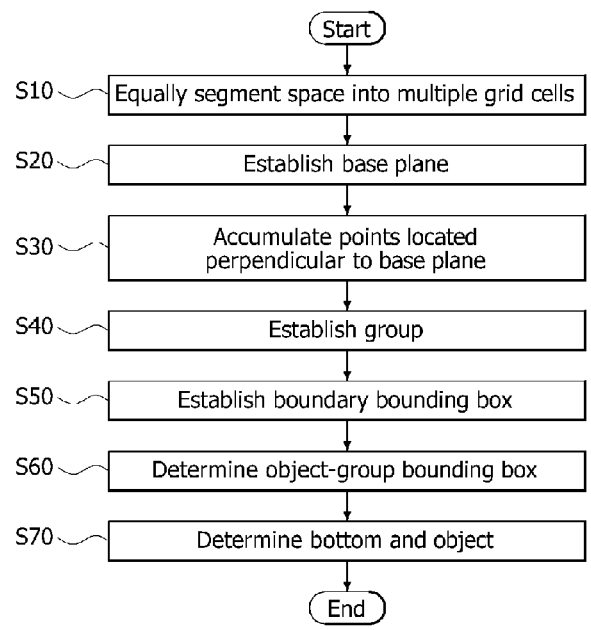
FIG. 2 is a flowchart illustrating a space segmentation method for 3D point clouds according to an embodiment of the present invention.
Figure 3:
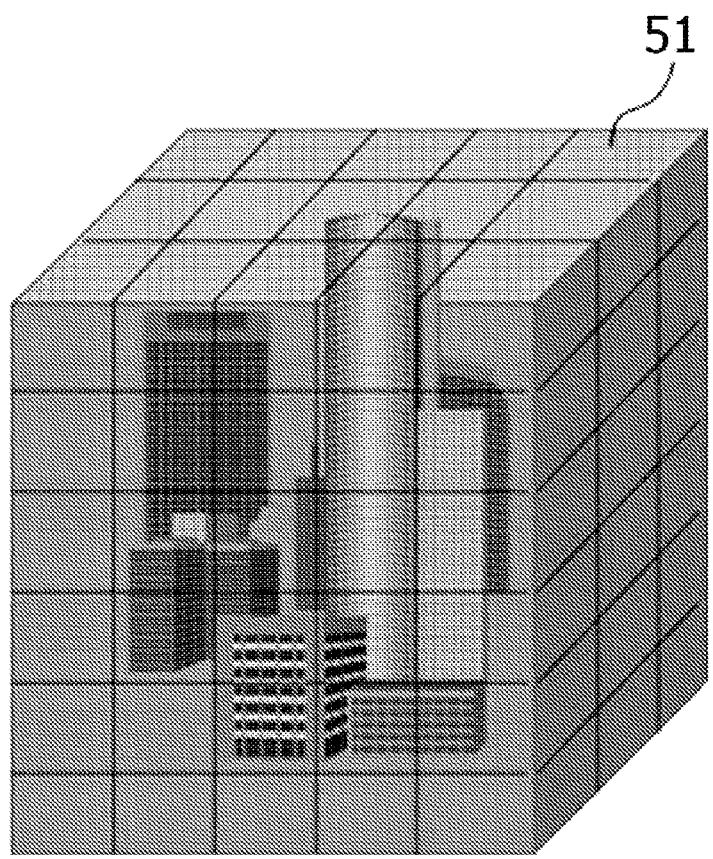
FIG. 3 shows a space equally divided into cube-shaped grid cells according to an embodiment of the present invention.
Figure 4:
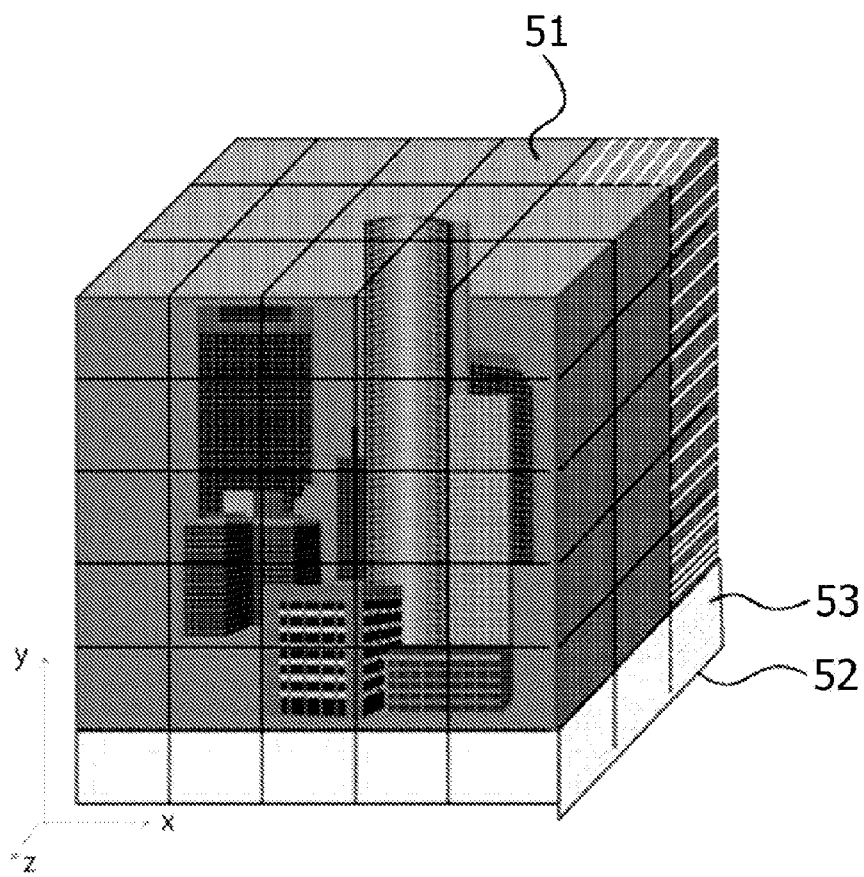
FIG. 4 exemplarily shows a base plane corresponding to the ground of a real world shown in FIG. 3.
Figure 5:
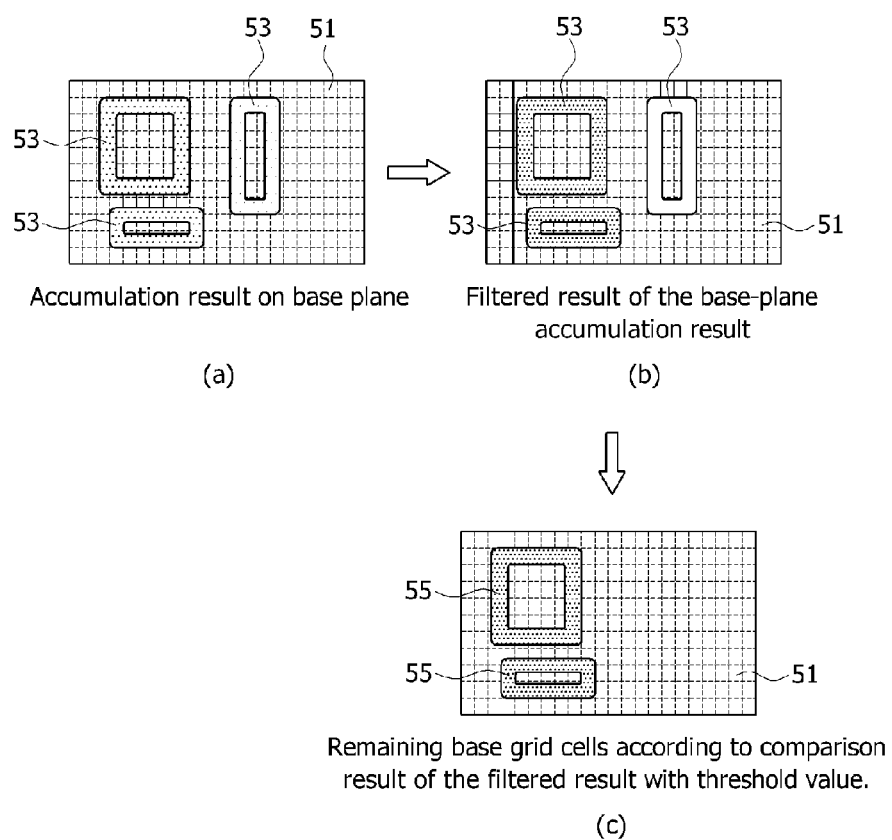
FIG. 5 is a conceptual diagram illustrating a method for determining an object-estimation grid cell by filtering the number of points corresponding to the accumulation of grid cells located perpendicular to the base plane shown in FIG. 4.
Figure 6:
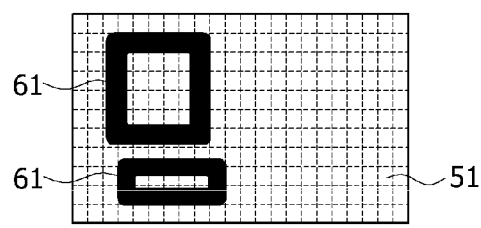
FIG. 6 is a conceptual diagram illustrating that object-estimation grid cells determined in FIG. 5 are established as a group.
Figure 7:
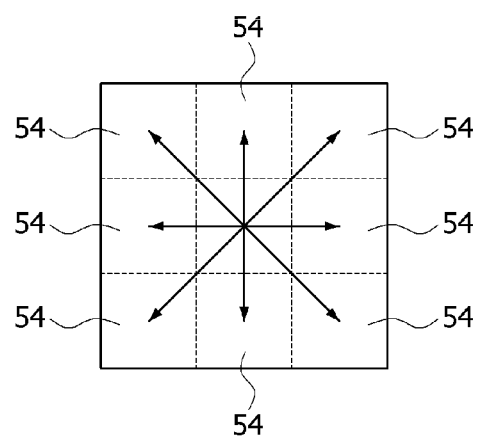
FIG. 7 shows that the object-estimation grid cells determined in FIG. 5 are established as a plurality of neighboring grid cells and one group.
Figure 8:
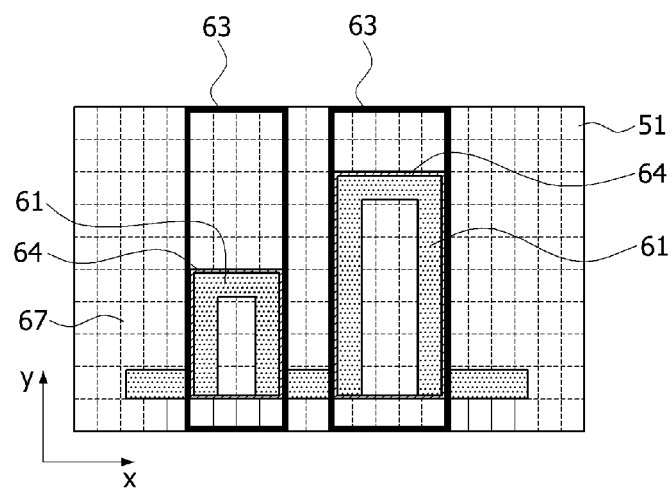
FIG. 8 shows that the group established through FIG. 6 is extended to 3D.
Figure 9:
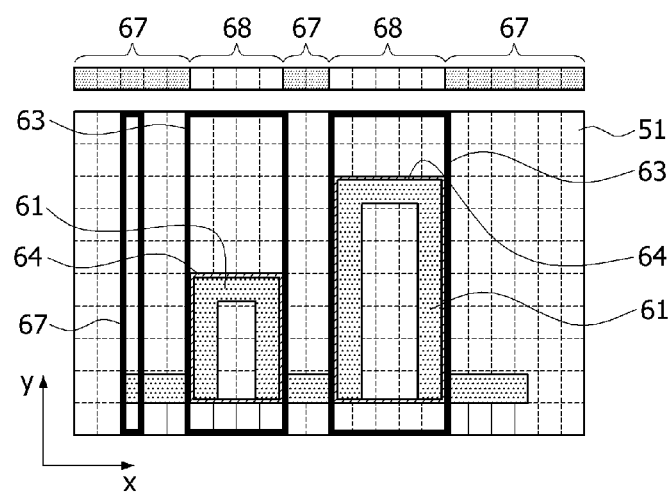
FIG. 9 shows a bounding box that indicates an object boundary using object-estimation grid cells through the concept of FIG. 8, and also shows that the remaining regions are grouped into the bottom part.

FIG. 2 is a flowchart illustrating a space segmentation method for 3D point clouds according to an embodiment of the present invention. FIG. 3 shows a space equally-divided into cube-shaped grid cells according to an embodiment of the present invention. FIG. 4 exemplarily shows a base plane corresponding to the ground of a real world shown in FIG. 3. FIG. 5 is a conceptual diagram illustrating a method for determining an object-estimation grid cell by filtering the number of points corresponding to the accumulation of grid cells located perpendicular to the base plane shown in FIG. 4. FIG. 6 is a conceptual diagram illustrating that object-estimation grid cells determined in FIG. 5 are established as a group. FIG. 7 shows that the object-estimation grid cells determined in FIG. 5 are established as a plurality of neighboring grid cells and one group. FIG. 8 shows that the group established through FIG. 6 is extended to 3D. FIG. 9 shows a bounding box that indicates an object boundary using object-estimation grid cells through the concept of FIG. 8, and also shows that the remaining regions are grouped into the ground part.

The space segmentation unit 20 equally segments 3D point clouds stored in the DB unit 10 into a plurality of grid cells 51 on the space 60 in step S10.

In this case, the size of the grid cell 51 may be determined by a user, and a maximum number of points for each cell 51 may be established and determined.

Referring to FIGS. 3 and 4, if the space segmentation unit 20 segments the 3D point clouds into a plurality of grid cells 51, the accumulator 30 establishes the base plane 52 in step S20, and accumulates all points located perpendicular to the base plane 52 in step S30.

That is, the space segmentation unit 20 sets an x-z plane to a bottom plane in consideration of object characteristics in which all the real-world objects located perpendicular to the ground, such that it can establish the base plane 52 in the equally-segmented space 60.

As described above, all objects located perpendicular to the ground in the space 60, such that the number of all points belonging to all the grid cells 51 located perpendicular to the base plane 52 is accumulated at each grid cell 51 (i.e., a base grid cell 53).

In this case, the result obtained when all points are accumulated at each base grid cell 53 is as follows. In more detail, the higher the height of vertically-accumulated points, the larger the number of points contained in the base grid cell 53. The lower the height of vertically-accumulated points, the smaller the number of points contained in the base grid cell 53. In other words, as the number of points contained in the base grid cell 53 increases, the probability of determining the corresponding points to be an object also increases.

In this case, referring to the number of points accumulated on the base plane 52, points can be incorrectly obtained due to scanning errors of the scanner device, such that the location error occurs in points. Since the points are not accumulated at the correct points of the base grid cell 53, location error may occur.

As described above, if the vertical points are accumulated on the basis of the base plane 52 by the space segmentation unit 20, the filter unit 40 further increases the degree of definition using the same filtering as high-frequency emphasis filtering, such that the base grid cell 53 exceeding a threshold value is determined to be an object-estimation grid cell 55 for object estimation.

Referring to FIG. 5(a), the base grid cell 53 is determined on the basis of the number of points accumulated on the base plane 52. In this case, if the corresponding grid cell has dark color, this grid cell is determined to be a base grid cell 53 having a large number of points.

Thereafter, the number of accumulated points is emphasized as shown in FIG. 5(b). In this case, it can be easily recognized that dark colors become darker and the light colors become lighter.

Finally, a plurality of object-estimation grid cells 55 exceeding a threshold value remain as shown in FIG. 5(c).

In this case, the threshold value is associated with the height, and is established by a user. A variety of filtering methods may be used as necessary.

If the object-estimation grid cell 55 is established through the filtering process, the grouping unit 50 establishes the group 61 using the object-estimation grid cell 55 and the neighbor grid cell 54 in step S40.

In this case, the object-estimation grid cells 55, each of which exceeds a threshold value, are arranged in descending numerical order of points, and a neighboring grid cell 54 for each object-estimation grid cell 55 is detected according to the arrangement order, and the detected grid cells are established as one group.

In this case, as shown in FIG. 7, the neighboring grid cell 54 is adjacent to the object-estimation grid cell 55 in up, down, left, right, and diagonal directions, and is combined with the object-estimation grid cell 55, such that the combined result is contained in one group 61.

Provided that the object-estimation grid cell 55 has already been contained in the group 61, the neighboring grid cell 54 is found and contained in the same group.

In addition, the object-estimation grid cell 55 and the neighboring grid cell 54 contained in the group 61 are considered to be the group 61 on the base plane 52. The above-mentioned grid cells 55 and 54 integrated into one group 61 can be extended to 3D as shown in FIG. 8. FIG. 8 is a lateral view of the resultant group.

The object-estimation grid cell 55 and the neighboring grid cell 54 are extended to 3D, such that a boundary bounding box 63 indicating the height of real-world bounding box is determined in step S50.

From among the grid cells 54 and 55 contained in the boundary bounding box 63, the smallest bounding box including the grid cells 54 and 55 including points is determined to be an object-group bounding box 64 indicating an object in step S60.

Referring to FIG. 9, if the object grouping is completed, base grid cells 53 not contained in the object-group bounding box 64 are determined to be a ground-estimation grid cell 67 for ground estimation.

In this case, from among the ground-estimation grid cell 67, one grid cell 51 including points simultaneously while being located at the lowest height on a Y-axis is determined to be the ground cell 67 in step S70.

The ground cell 67 is established as a ground group, and the object cells 68 indicating the object in the remaining part other than the ground group are established as an object group.

As described above, the space segmentation method for 3D point clouds according to the present invention receives 3D point clouds as an input signal, and automatically divides the 3D point clouds into an object part and a ground part using object characteristics in which a real-world object is located perpendicular to the ground.

As is apparent from the above description, the space segmentation method for 3D point clouds according to the present invention automatically segments 3D point clouds into an object and a ground part in real time, such that a building, a tree, a vehicle, etc. can be easily recognized from points of each divided object.

While the present invention has been described with respect to the specific embodiments, it will be apparent to those skilled in the art that various changes and modifications may be made without departing from the spirit and scope of the invention as defined in the following claims.

What is claimed is:

1. A space segmentation method for 3D point clouds, the method comprising:
    equally segmenting a space of the 3D point clouds into a plurality of grid cells;
    establishing a base plane corresponding to a bottom part of the space of the 3D point clouds;
    accumulating points of all grid cells of each column into a grid cell located on the base plane of each column, the column being extended perpendicularly from the grid cell located on the base plane
    filtering a total number of the accumulated points;
    determining a corresponding grid cell located on the base plane to be an object-estimation grid cell used for object estimation when a value of definition of each grid cell of the base plane is equal to or higher than a threshold value; and
    determining the grid cell located on the base plane of each column as an object part or a ground part based on the filtered total number of accumulated points.

2. The method according to claim 1, wherein equally segmenting a space of the 3D point clouds into a plurality of grid cells includes:
    equally segmenting a space of the 3D point clouds into a plurality of grid cells based on a number of points included in the 3D point clouds.

3. The method according to claim 1, wherein determining the grid cell located on the base plane of each column as an object part or a ground part based on the filtered total number of accumulated points includes:
    arranging the object-estimation grid cells in descending numerical order of the accumulated points, searching for a neighboring grid cell adjacent to the object-estimation grid cells according to the arranged order, and establishing a group using the searched result;
    extending the group to a three-dimensional (3D) range, and establishing an object-estimation bounding box estimated to be the object part;
    from among the object-estimation grid cells and the neighboring grid cell contained in the object-estimation bounding box, determining the smallest bounding box including the points to be an object-group bounding box indicating the object part; and
    determining a ground cell indicating the ground part using base-plane base grid cells not contained in the object-group bounding box.

4. The method according to claim 3, wherein the neighboring grid cell is a grid cell located adjacent to the object-estimation grid cell in up, down, left, right, and diagonal directions.

5. The method according to claim 3, wherein the establishing the group by searching for the neighboring grid cell adjacent to the object-estimation grid cells includes:
    incorporating the object-estimation grid cells and the neighboring grid cell in the same group.

6. The method according to claim 5, wherein the establishing the group by searching for the neighboring grid cell adjacent to the object-estimation grid cells includes:
    if the object-estimation grid cells are previously contained in the group, incorporating the corresponding object-estimation grid cells in the same group.

7. The method according to claim 3, wherein the determining the ground cell indicating the ground part includes:
    from among the base grid cells not contained in the object-group bounding box, determining the lowest-height grid cell including the points to be the ground cell.

* * * * *